United States Patent [19]

Smith

[11] Patent Number: 5,129,080

[45] Date of Patent: Jul. 7, 1992

[54] METHOD AND SYSTEM INCREASING THE OPERATIONAL AVAILABILITY OF A SYSTEM OF COMPUTER PROGRAMS OPERATING IN A DISTRIBUTED SYSTEM OF COMPUTERS

[75] Inventor: Donald M. Smith, Germantown, Md.

[73] Assignee: International Business Machines Corporation, Armonk, N.Y.

[21] Appl. No.: 599,178

[22] Filed: Oct. 17, 1990

[51] Int. Cl.⁵ .............................................. G06F 11/20
[52] U.S. Cl. .................................... 395/575; 395/650;
364/DIG. 1; 364/228.3; 364/268.4; 364/268.9;
364/269.2; 364/268.1
[58] Field of Search ................ 364/200, 900; 371/9.1,
371/10.2

[56] References Cited

U.S. PATENT DOCUMENTS

| | | | |
|---|---|---|---|
| 3,636,331 | 1/1972 | Amrehn | 364/200 |
| 4,099,241 | 7/1978 | Ossfeldt | 364/200 |
| 4,321,666 | 3/1987 | Tasai et al. | 364/200 |
| 4,356,546 | 10/1987 | Whiteside et al. | 364/200 |
| 4,819,232 | 4/1989 | Krings | 371/9.1 |
| 5,008,805 | 4/1991 | Fiebig et al. | 371/9.1 X |

FOREIGN PATENT DOCUMENTS 0287539 10/1988 European Pat. Off. .

OTHER PUBLICATIONS

IBM TDB "Synchronous Multi Processing Fail Detection" by J. F. Dirac, vol. 7, No. 3, Aug. 1964, pp. 218–219.
IBM TDB "Shared Redundancy File Subsystem" by R. A. Peterson, vol. 25, No. 1, Jun. 1982 pp. 433–435.
TBM TDB "Organizational Redundancy for a Parallel Processor Machine" Brantley et al., vol. 28, No. 1, Jun. 1985, pp. 417–418.

Primary Examiner—Thomas M. Heckler
Attorney, Agent, or Firm—Jesse L. Abzug

[57] ABSTRACT

A system and method are disclosed to organize computer software operating in a distributed sytem of computers, so that its recovery from a failure of either the software or the hardware occurs before the failure becomes operationally visible. The software is made to recover from the failure and reprocess or reject the stimulus such that the result is available to the user of the system within the specified response time for that type of stimulus.

6 Claims, 7 Drawing Sheets

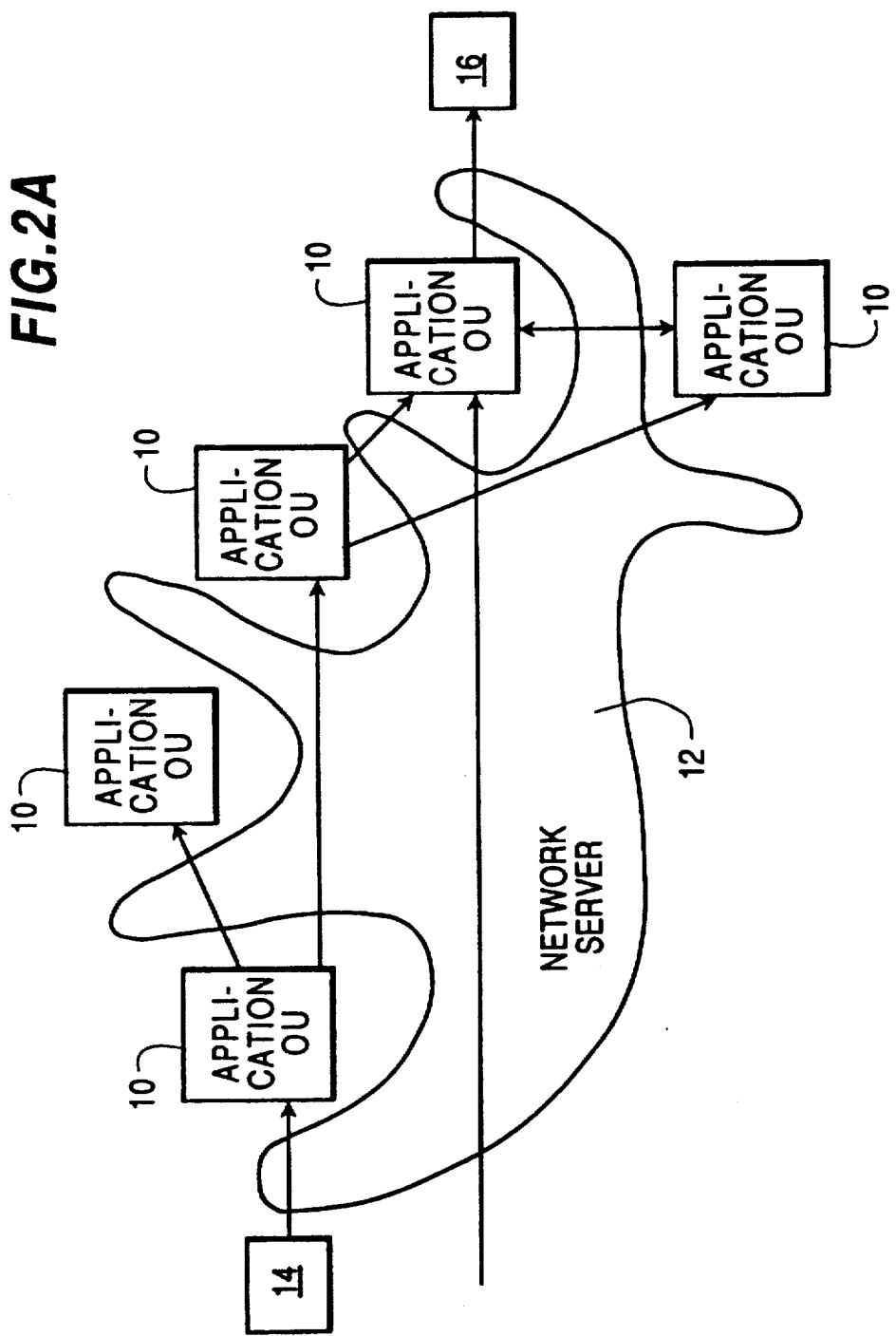

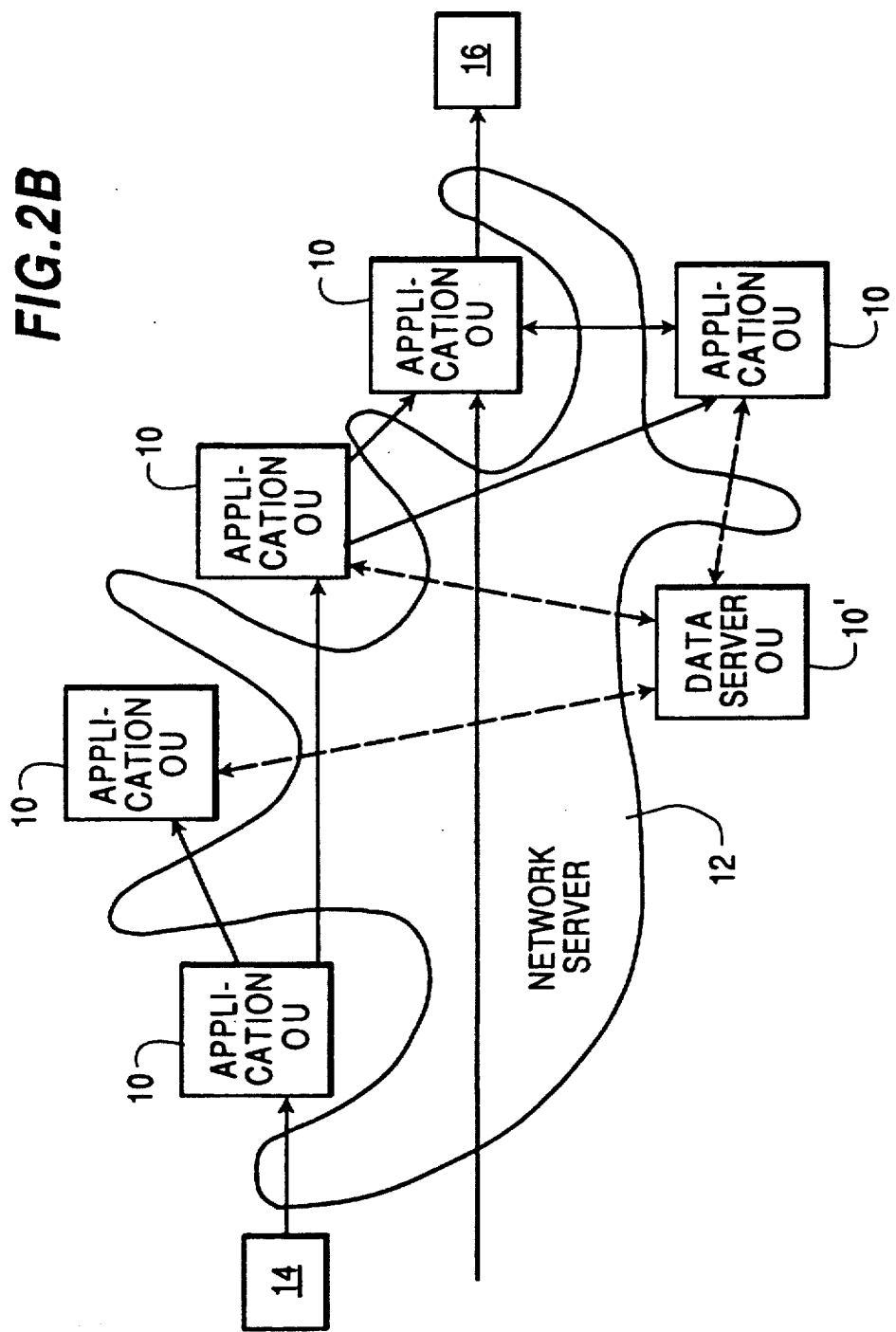

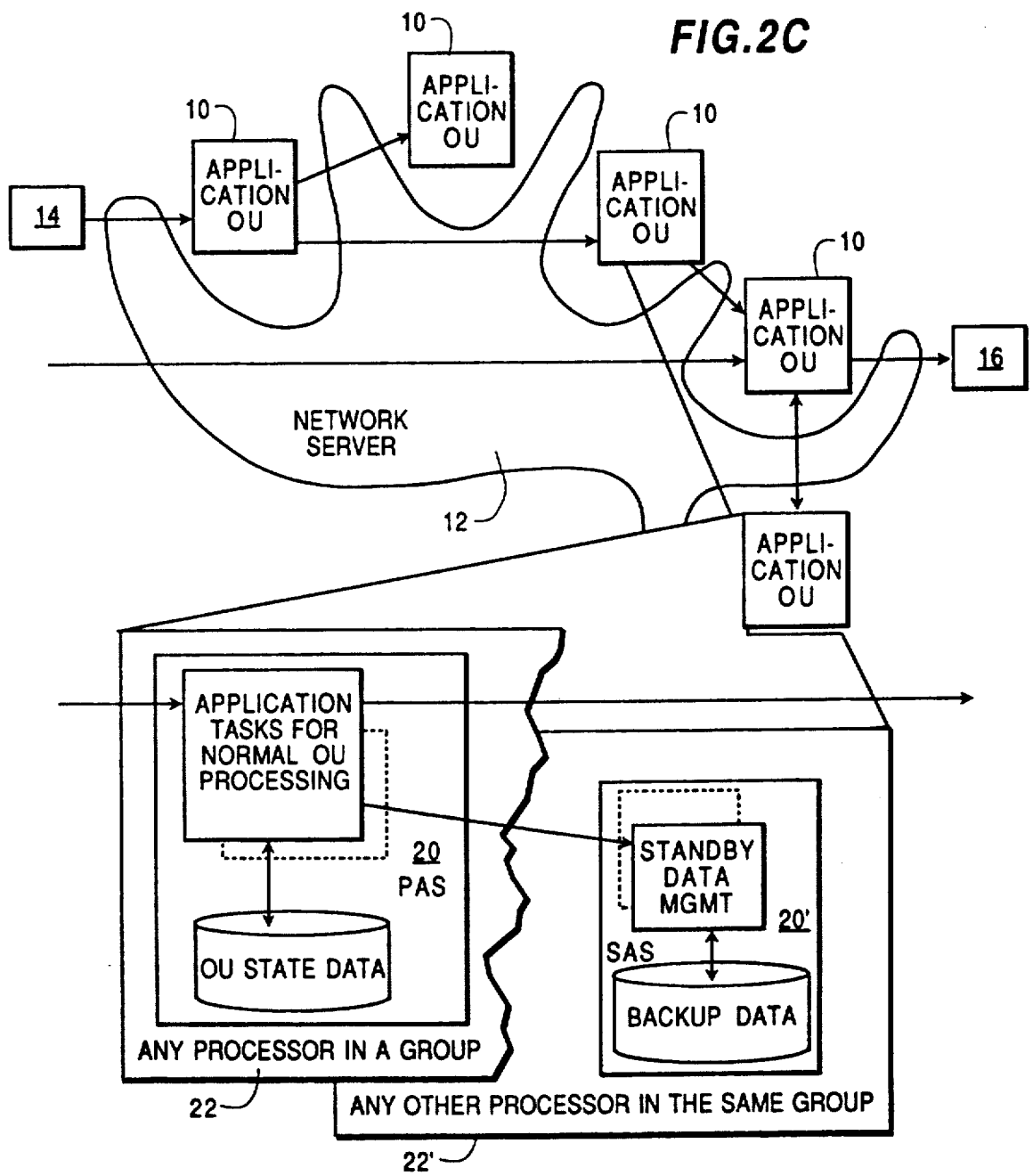

METHOD AND SYSTEM INCREASING THE OPERATIONAL AVAILABILITY OF A SYSTEM OF COMPUTER PROGRAMS OPERATING IN A DISTRIBUTED SYSTEM OF COMPUTERS

BACKGROUND OF THE INVENTION

1. Technical Field

The invention disclosed broadly relates to data processing systems and more particularly relates to systems and methods for enhancing fault tolerance in data processing systems.

2. Background Art

Operational availability is defined as follows: "If a stimulus to the system is processed by the system and the system produces a correct result within an allocated response time for that stimulus, and if this is true for all stimuli, then the system's availability is 1.0."

It is recognized that there are many contributors to high operational availability: (1) failures in both the hardware system and the software system must be detected with sufficiently high coverage to meet requirements; (2) the inherent availability of the hardware (in terms of simple numerical availability of its redundancy network), including internal and external redundancy must be higher than the system's required operational availability; and (3) failures in the software must not be visible to or adversely affect operational use of the system. This invention addresses the third of these contributors with the important assumption that software failures due to design errors and to hardware failures, will be frequent and hideous.

The prior art has attempted to solve this type of problem by providing duplicate copies of the entire software component on two or more individual processors, and providing a means for communicating the health of the active processor to the standby processor. When the standby processor determines, through monitoring the health of the active processor, that the standby processor must take over operations, the standby processor initializes the entire software component stored therein and the active processor effectively terminates its operations. The problem with this approach is that the entire system is involved in each recovery action. As a result, recovery times tend to be long, and failures in the recovery process normally render the system inoperable. In addition, if the redundant copies of the software systems are both normally operating (one as a shadow to the other), then the effect of common-mode failures is extreme and also affects the whole system.

OBJECT OF THE INVENTION

It is therefore an object of the invention to increase the operational availability of a system of computer programs operating in a distributed system of computers.

It is another object of the invention to provide fault tolerance in a system of computer programs operating in a distributed system of computers, having a high availability and fast recovery time.

It is still a further object of the invention to provide improved operational availability in a system of computer programs operating in a distributed system of computers, with less software complexity, than was required in the prior art.

SUMMARY OF THE INVENTION

These and other objects, features and advantages of the invention are accomplished as follows. This invention provides a mechanism to organize the computer software in such a way that its recovery from a failure (of either itself or the hardware) occurs before the failure becomes operationally visible. In other words, the software is made to recover from the failure and reprocess or reject the stimulus so that the result is available to the user of the system within the specified response time for that type of stimulus.

A software structure that will be referred to as an operational unit (OU), and a related availability management function (AMF) are the key components of the invention. The OU and portions of the AMF are now described. The OU concept is implemented by partitioning as much of the system's software as possible into independent self-contained modules whose interactions with one another is via a network server. A stimulus enters the system and is routed to the first module in its thread, and from there traverses all required modules until an appropriate response is produced and made available to the system's user.

Each module is in fact two copies of the code and data-space of the OU. One of the copies, called the Primary Address Space (PAS), maintains actual state data. The other copy, called the Standby Address Space (SAS), runs in a separate processor, and may, or may not maintain actual state data, as described later.

The Availability Management Function (AMF) controls the allocation of PAS and SAS components to the processors. When the AMF detects an error, a SAS becomes PAS and the original PAS is terminated. Data servers in the network are also informed of the change so that all communication will be redirected to the new PAS. In this fashion, system availability can be maintained.

BRIEF DESCRIPTION OF THE DRAWINGS

These and other object, features and advantages of the invention will be more fully appreciated with reference to the accompanying figures.

FIG. 2A is a schematic diagram of several operational units in a network.

FIG. 2B is an alternate diagram of the operational unit architecture illustrating the use of a data server OU by several applications.

FIG. 2C is an illustration of the operational unit architecture.

DESCRIPTION OF THE BEST MODE FOR CARRYING OUT THE INVENTION

Figure 1:
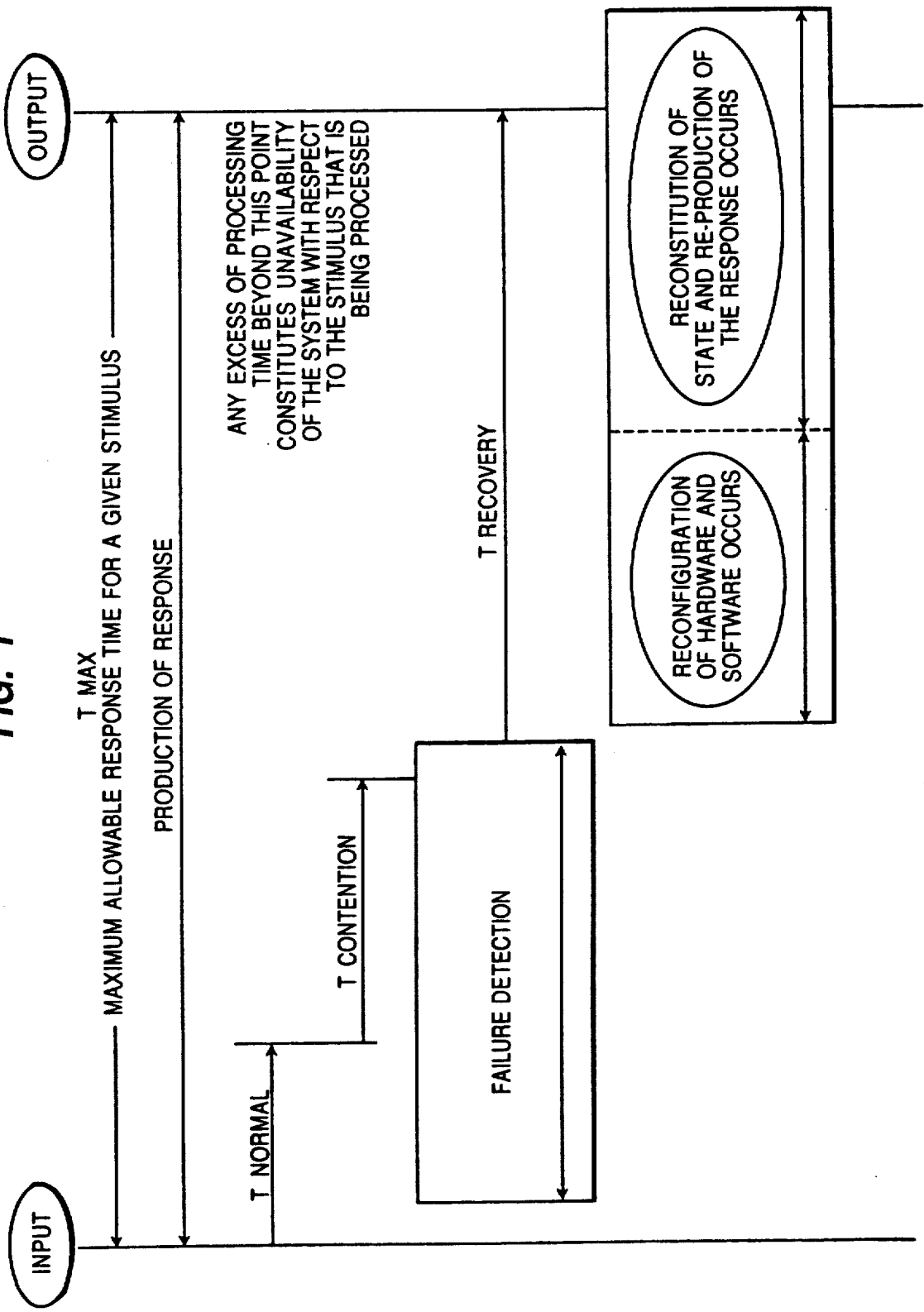
FIG. 1 is a timing diagram illustrating response time allocation.

FIG. 1 shows a timing diagram illustrating response time allocation. The required response time (Tmax) between a stimulus input and its required output suballocated so that a portion of it is available for normal production of the response (Tnormal), a portion is available for unpredicted resource contention (Tcontention), and a portion is available for recovery from failures (Trecovery). The first of these, Tnormal, is divided among the software and hardware elements of the system in accordance with their processing requirements. This allocation will determine the performance needed by each hardware and software component of the system. The second portion, Tcontention, is never allocated. The last portion, Trecovery, is made sufficiently long that it includes time for error detection (including omission failures), hardware reconfiguration, software reconfiguration, and reproduction of required response A rule of thumb is to divide the required response time Tmax in half and subdivide the first half so that one quarter of the required response time is available for normal response production Tnormal, and the second quarter is available for unpredicted resource contention, Tcontention. The second half of the response time, Trecovery, is then available for failure detection and response reproduction.

The specific problem addressed by this invention is how to reduce the time required for hardware and software reconfiguration, Trecovery, of a complex system to a small fraction of Tmax. This problem is solved by a software structure that will be referred to as an operational unit (OU), and a related availability management function (AMF). The OU and portions of the AMF are now described.

Referring to FIG. 2A, the OU concept is implemented by partitioning as much of the system's software as possible into independent self-contained modules or OU's 10 whose interactions with one another is via a network server 12. None of these modules shares data files with any other module, and none of them assumes that any other is (or is not) in the same machine as itself. A stimulus 14 enters the system and is routed to the first module until an appropriate response is produced and made available to the system's user 16.

Each module maintains all necessary state data for its own operation. If two or more modules require access to the same state knowledge then: (1) each must maintain the knowledge; (2) updates to that knowledge must be transmitted among them as normal processing transactions; or (3) each must be tolerant of possible differences between its knowledge of the state, and the knowledge of the others. This tolerance may take on several forms depending on the application, and may include mechanisms for detecting and compensating (or correcting) for differences in state. If two modules 10 absolutely must share a common data base for performance or other reason, then they are not "independent" and are combined into a single module for the purpose of this invention.

It is acceptable for one module 10' to perform data server functions for multiple other modules (as shown in FIG. 2B) providing those other modules 10 can operationally compensate for failure and loss of the server function. Compensate means that they continue to provide their essential services to their clients, and that the inability to access the common state does not result in queuing or interruption of service. Clearly this constrains the possible uses of such common servers.

Finally, a module 10 must provide predefined degraded or alternative modes of operation for any case where another module's services are used, but where that other module is known to be indefinitely unavailable. An exception to this rule is that if a server is part of a processor (if it deals with the allocation or use of processor resources), then the module may have unconditional dependencies on the server. In this case, failure of the server is treated by the availability management function as failure of the processor. If a module conforms to all of the above conditions, then it becomes an OU through the application of the following novel structuring of its data, its logic and its role within the system. This structure is shown in FIG. 2C.

Two complete copies of the modules are loaded into independent address spaces 20, 20' in two separate computers 22, 22'. One of these modules is known by the network server as the Primary Address Space (PAS) and is the one to which all other module's service requests are directed. The other of these modules is called the Standby Address Space (SAS), and is known only by the PAS. It is invisible to all other modules. The PAS sends application dependent state data to the SAS so that the SAS is aware of the state of the PAS. Whether the interface between the PAS and the SAS of an OU is a synchronous commit or is an unsynchronized interface is not limited by this invention, and is a trade-off between the steady-state response time, and the time required for a newly promoted PAS to synchronize with its servers and clients. This trade-off is discussed in strategy #1 below.

The PAS maintains the state necessary for normal application processing by the module. The SAS maintains sufficient state knowledge so that it can transition itself to become the PAS when and if the need should arise. The amount of knowledge this requires is application dependent, and is beyond the scope of this invention.

Both the PAS and the SAS of an OU maintain open sessions with all servers of the OU. The SAS sessions are unused until/unless the SAS is promoted to PAS. When the SAS is directed by the AMF to assume the role of PAS, it assures that its current state is self-consistent (a failure may have resulted from the PAS sending only part of a related series of update messages), and then communicates with clients and servers of the PAS to establish state agreement with them. This may result in advancing the SAS's state knowledge or in rolling back the state knowledge of the clients and servers. Any rolling back must be recovered by reprocessing any affected stimuli, and/or by informing users that the stimuli have been ignored. Simultaneous with this process, the network server is updated so that it directs all new or queued service requests to the SAS instead of the PAS. This last action constitutes promotion of the SAS to the position of PAS, and is followed by starting up a new SAS in a processor other than the one occupied by the new PAS.

Several strategies for maintenance of standby data by the PAS are relevant to the invention. They are summarized as follows.

Strategy #1. The SAS may retain a complete copy of the state of the PAS. If the copy is committed to the SAS before the PAS responds to its stimulus, then the restart recovery will be very fast, but the response time for all stimuli will be the longest. This approach is superior if response time requirements allow it.

Strategy #2. The SAS may retain a "trailing" copy of the state of the PAS. Here, the PAS sends state updates as they occur, at the end of processing for a stimulus, or batches them for several stimuli. The SAS trails the PAS state in time and must therefore be concerned with state consistency within its data and between itself and its servers and clients. This yields very fast steady-state response time but requires moderate processing during failure recovery.

Strategy #3. The SAS may retain knowledge of the stimuli currently in process by the PAS so that at failure, the exact state of the relationships between the PAS and its clients and servers is known by the SAS. This requires commitment of beginning and end of transactions between the PAS and the SAS, but reduces the inter-OU synchronization required during failure recovery.

These mechanisms may be used alone or in various combinations by an OU. The determination of which to use is a function of the kinds of stimuli, the response time requirements, and the nature of the state retained by the application.

THE AVAILABILITY MANAGEMENT FUNCTION (AMF)

The characteristics just described comprise an OU, but do not by themselves achieve availability goals. Availability goals are achieved by combining this OU architecture with an AMF that controls the state of all OU's in the system. The AMF has three components, each with its own roles in the maintenance of high availability of the system's OU's. The relationship between an OU and the AMF is illustrated in FIGS. 3A through 3F and is described below.

Figure 2D:
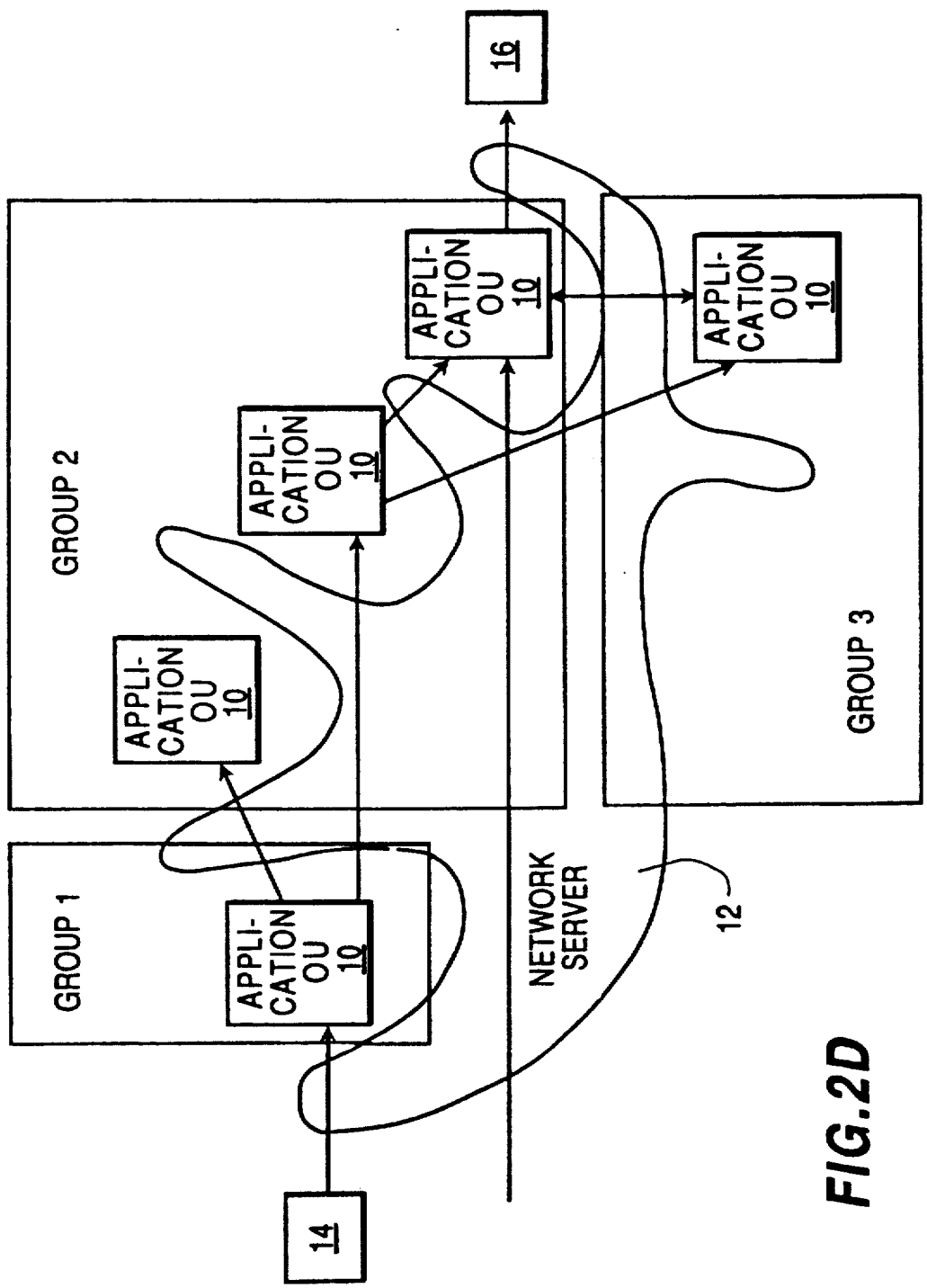
FIG. 2D is an illustration of the operational unit architecture showing an example of the allocation of general operational units across three groups.

The most important AMF function is that of group manager. A group is a collection of similarly configured processors that have been placed into the network for the purpose of housing a predesignated set of one or more OU's. Each group in the system (if there are more than one) is managed independently of all other groups. In FIG. 2D, three groups are shown. Here, the OU's residing in each group (rather than the processors) are shown.

The number of processors in each group, and the allocation of OU PAS and SAS components to those processors may be widely varied in accordance with the availability requirement, the power of each processor, and the processing needs of each PAS and SAS component. The only constraint imposed by the invention is that the PAS and the SAS of any single OU must be in two different processors if processor failures are to be guarded against.

Figure 3A:
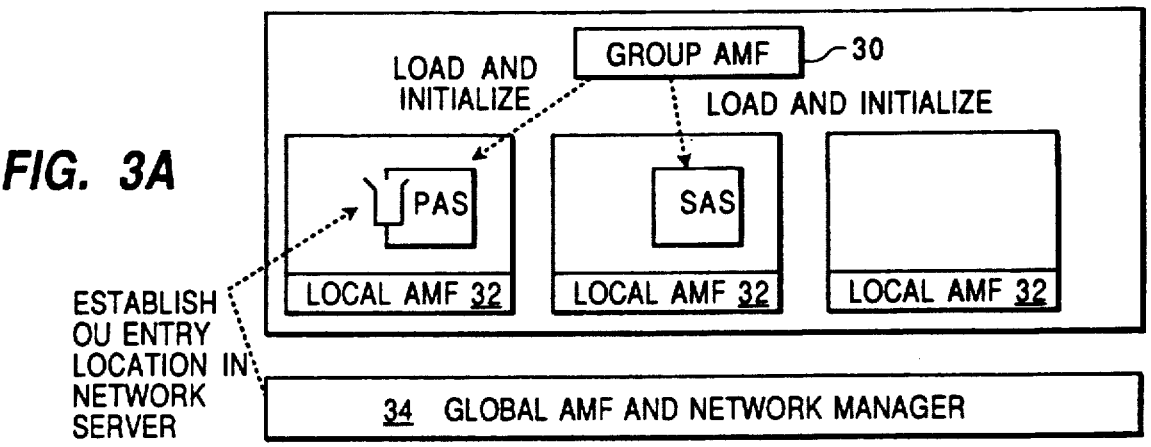
FIG. 3A-F shows of the operational unit at various stages during the initialization and operation, reconfiguration and recovery functions.

Group Management: Referring to FIG. 3A, the group manager resides in one of the processors of a group (the processor is determined by a protocol not included in this invention). It initializes the group for cold starts, and reconfigures the group when necessary for failure recovery. Within the group, each OU's PAS and SAS exist on separate processors, and sufficient processors exist to meet inherent availability requirements. The group manager monitors performance of the group as a unit and coordinates the detection and recovery of all failures within the group that do not require attention at a system level. This coordination includes the following:

1. Commanding the takeover of an OU's functional responsibilities by the SAS when it has been determined that a failure has occurred in either the PAS, or in the processor or related resource necessary to the operation of the PAS.

2. Initiating the start-up of a new address space to house a new SAS after a prior SAS has been promoted to PAS.

3. Updating the network server's image of the location of each OU as its PAS moves among the processors of a group in response to failures or scheduled shutdown of individual group processors.

Errors detected by the group manager include processor failure (by heartbeat protocols between group members), and failures of an OU that affect both its PAS and SAS, for example, those caused by design errors in the communication between them or the common processing of standby/backup state data. The mechanisms for error detection are beyond the scope of the invention.

Local Management: Group level support of the OU architecture relies on the presence of certain functions within each processor of the group. These functions are referred to as the AMF's local manager 32. The local manager is implemented within each processor as an extension of the processor's control program and is responsible for detecting and correcting failures that can be handled without intervention from a higher (group or above) level. The local manager maintains heartbeat protocol communications with each OU PAS or SAS in its processor to watch for abnormalities in their performance. It also receives notification from the operating system of any detected machine level hardware or software problem. Any problem that cannot be handled locally is forwarded to the group manager for resolution.

Global Management: The isolation and correction of system level problems and problems associated with the network fall with the AMF's global manager 34. The global manager 34 correlates failures and states at the lower levels to detect and isolate errors in network behavior, group behavior, and response times of threads involving multiple processors. It also interacts with human operators of the system to deal with failures that the automation cannot handle. The global manager is designed to operate at any station in the network, and is itself an OU. The movement of the global manager 34 OU from one group to another, if necessary, is initiated and monitored by the human operator using capabilities contained in the local manager at each processor station.

Network Management: The network manager is a part of the AMF global manager 34. Its functionality and design is configuration dependent, and is beyond the scope of this invention.

Figure 3B:
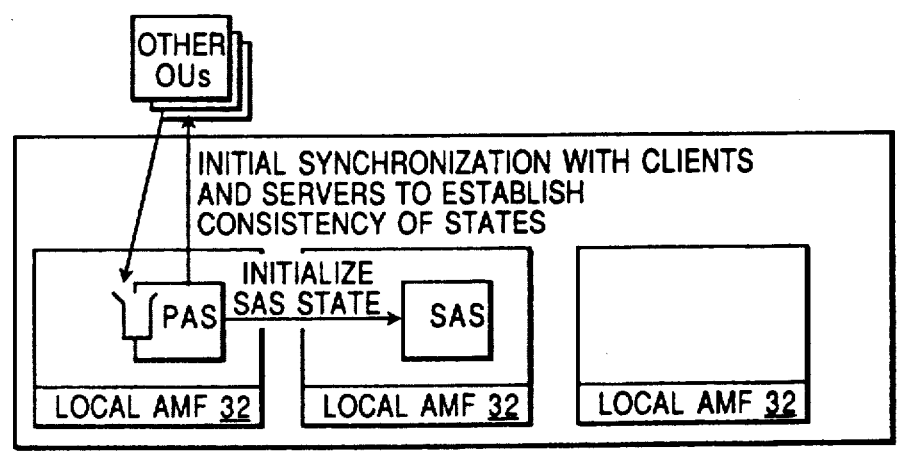
Figure 3C:
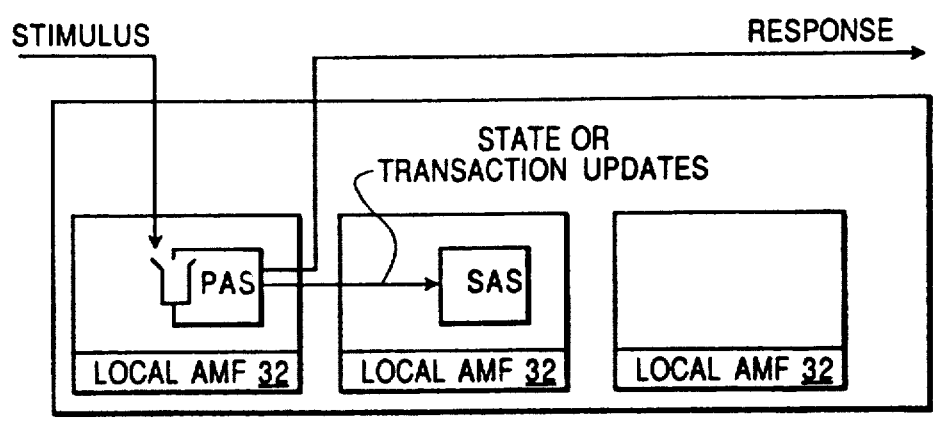

FIGS. 3A-F show the functionality for the AMF during initialization, operation, reconfiguration and recovery of the system. In FIG. 3A, PAS and SAS are loaded and initialized. OU locations are entered in the network server. FIG. 3B shows the synchronization of the PAS and SAS with clients and servers to establish consistency of states. FIG. 3C shows steady state operation with PAS responding to a stimulus and outputting a response. The SAS is kept updated by the PAS.

Figure 3D:
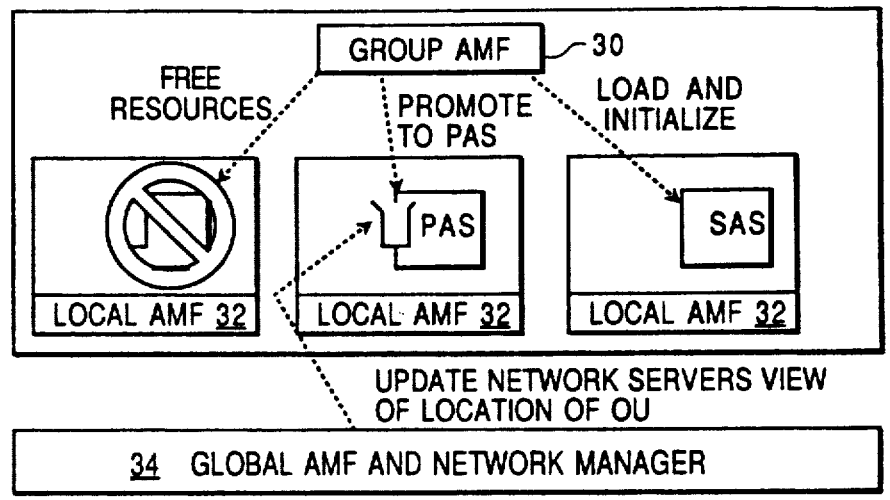
Figure 3E:
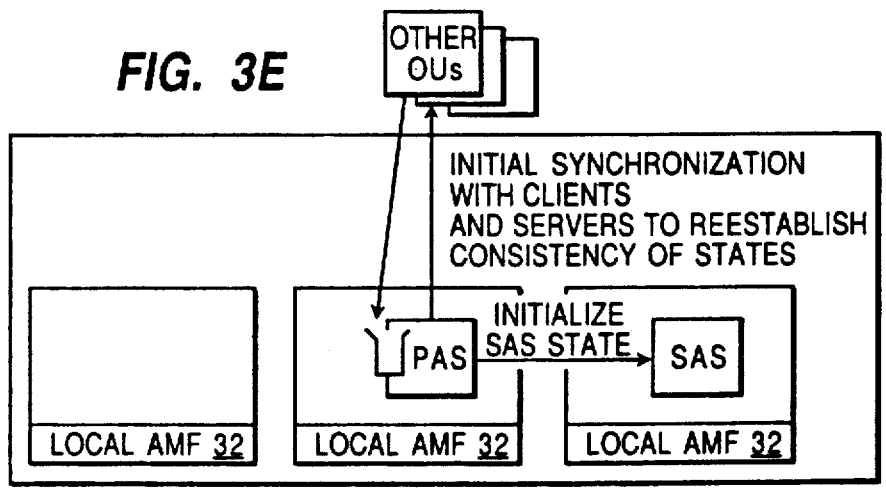
Figure 3F:
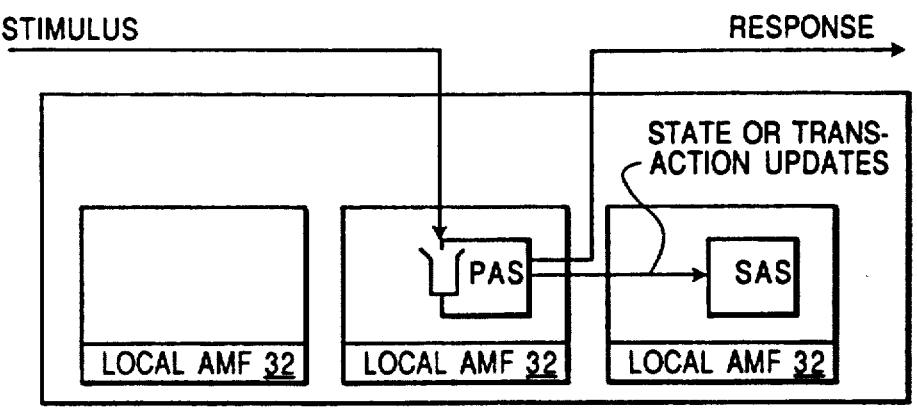

FIG. 3D shows what happens when the PAS fails. The old SAS is promoted to new PAS and a new SAS is loaded and initialized. The network servers are also updated with the new location of the OU. FIG. 3E shows re-synchronization of the new PAS with the clients and servers. At steady state (FIG. 3E), the new PAS is responding to stimuli as normal.

It is the combination of the OU structure and the recovery functions of the AMF that constitute this invention. By comparison, the contemporary strategy and mechanisms of software failover/switchover deal with units of entire processors rather than with smaller units of software as in this invention. Because the unit of failure and recovery achieved by this invention is small by comparison, the time for recovery is also small. Furthermore, the recovery from processor level failures can be accomplished in small steps spread across several processors (as many as are used to contain SAS's for the PAS's contained in the failed processor). This is crucial to maintaining continuous high availability operation in large real time systems.

Although a specific embodiment of the invention has been disclosed, it will be understood by those having skill in the art that changes can be made to the specific embodiment without departing from the spirit and the scope of the invention.

What is claimed is:

1. A method for increasing the operational availability of a system of computer programs operating in a distributed system of computers, comprising:

dividing a computer program into a plurality of functional modules;

loading a first copy of a functional module into a first processor's address space and locating a second copy of said functional module into a second processor's address space;

said first processor executing said first functional module to send application dependent state data to said second processor where it is received by said second functional module executing on said second processor;

said first processor executing said module, maintaining a normal application processing state and said second processor executing said second module, maintaining a secondary state knowledge sufficient to enable it to become a primary functioning module;

said first processor executing said first module maintaining open sessions with a plurality of servers connected therewith in a network and said second processor executing said second module maintaining a plurality of open sessions with all of said servers in said network;

said second functional module, in response to a stimulus requiring it to assume the role of said first functional module, checking that its current state is consistent with the current state of said first functional module, followed by said second module then communicating with said servers in said network to establish synchronization with the state of said servers;

all clients and servers connected in said network responding to said second module assuming the role of said first module, by directing all new or queued service requests to said second module instead of to said first module;

whereby said second module assumes the role of said first module in performing primary address space operations.

2. The method of claim 1 wherein said first module and said second module communicate synchronously.

3. The method of claim 1 wherein said first module and said second module communicate asynchronously.

4. The method of claim 1 wherein said second module retains a complete copy of the state of said first module.

5. The method of claim 1 wherein said second module retains a trailing copy of the state of said first module.

6. The method of claim 1 wherein said second module retains knowledge of the stimuli currently in process by said first module.

* * * * *